United States Patent Office 3,686,176
Patented Aug. 22, 1972

3,686,176
1-MORPHOLINO PHENOXY-3-ALKYLAMINO-2-PROPANOLS
Ronald Stiles Stuart, Mount Royal, Quebec, and Burton Kendall Wasson, Valois, Quebec, Canada, assignors to Charles E. Frosst & Co., Kirkland, Quebec, Canada
No Drawing. Filed Mar. 9, 1970, Ser. No. 17,858
Int. Cl. C07d 87/40
U.S. Cl. 260—247.5 R        5 Claims

ABSTRACT OF THE DISCLOSURE

1 - (morpholinophenoxy) - 3 - (substituted-amino)propan-2-ol compounds that exhibited β-adrenergic blocking properties are described. The compounds ideally are prepared by the reaction of an N-(2,3-epoxypropoxyphenyl) morpholine with an amine or by the reaction of an N-(3-halo-2-hydroxypropoxyphenyl)morpholine with an amine.

---

This invention is concerned with 1-(morpholinophenoxy)-3 - (substituted amino)propan-2-ols and methods for their preparation. These compounds exhibit β-adrenergic blocking properties and have the marked advantage of having a long duration of activity.

The novel β-adrenergic blocking agents of this invention have the structure

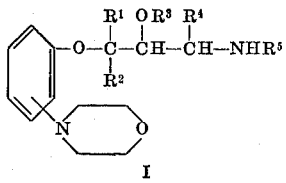

I and includes the pharmacologically active salts thereof. In the above structure the morpholino substituent is attached in ortho, meta or para position in relation to the oxypropanolamine substituent, $R^1$ is selected from hydrogen and lower alkyl having from 1 to 3 carbon atoms; $R^2$ is selected from hydrogen, lower alkyl having from 1 to 3 carbon atoms; $R^3$ is selected from hydrogen, benzoyl or lower alkanoyl wherein the alkanoyl group contains from 2 to 4 carbon atoms; $R^4$ is selected from hydrogen and lower alkyl having from 1 to 3 carbon atoms; $R^5$ represents lower alkyl having a straight or branched chain having from 1 to about 20 carbons but preferably a branched chain alkyl having from 3 to 6 carbons such as isopropyl, tert-butyl, 2,2-dimethylpropyl, and the like, lower cycloalkyl advantageously having from 3 to 10 carbon atoms such as cyclopropyl, cyclobutyl, cyclopentyl, cyclohexyl and tricyclodecane such as adamantyl, and the like, alkenyl or alkynyl, $C_{2-6}$, such as 1 - methylpropen-2-yl, 1,1-dimethylpropen-2-yl, 1-methylpropyn-2-yl, 1,1-dimethylpropyn - 2 - yl, and the like, phenalkyl wherein the alkyl moiety advantageously has from 1 to 5 carbon atoms and the phenyl moiety is either unsubstituted or substituted with one or more similar or dissimilar groups selected from halogen, preferably chloro or bromo, hydroxy, lower alkyl having from 1 to 3 carbon atoms, and lower alkoxy having from 1 to 3 carbon atoms.

Suitable pharmacologically active salts of the novel products of this invention are acid addition salts derived from inorganic acids, for example, hydrochlorides, hydrobromides, phosphates or sulfates or salts derived from organic salts, for example, oxalates, lactates, maleates, malates, formates, acetates, succinates, tartrates, salicylates, citrates, phenylacetates, benzoates, p-toluene-sulfonates and other salts such as those that provide relatively insoluble products that afford a slow release of the active material, for example, a 1,1'-methylene-bis(2-hydroxy-3-naphthylate) and the like.

The novel 1 - (morpholinophenoxy-3-(substituted amino)propan-2-ols which contain one asymmetric carbon atom in the propylene chain will be obtained as racemic compounds which can be separated into optically active isomers by known methods, for example, by forming a salt with an optically active acid, many of which are known to those skilled in the art, such as optically active tartaric, mandelic, cholic, O-di-p-toluoyl tartaric, O,O-dibenzoyl tartaric acids, or other acids conventionally employed for this purpose. Those products that contain two or more asymmetric carbons in the propylene chain will be obtained as diastereoisomers, and each diastereoisomer, of course, also will be obtained as a racemic compound which can be separated into its optically active isomers by known methods such as described above.

The optically active morpholinophenoxypropanolamines also can be prepared by employing an optically active epichlorhydrin or other optically active starting material having an asymmetric carbon that can itself be resolved or prepared in the desired optically active configuration.

While all of the compounds embraced by the above definition possess β-adrenergic blocking properties of the type discussed above, those products wherein $R^1$, $R^2$, $R^3$, $R^4$ are hydrogen have been found to exhibit β-adrenergic properties to a marked degree and within this subgroup of products those wherein $R^5$ is a branched chain alkyl having 3 to 6 carbons and wherein the morpholino substituent is attached in ortho position have been found to exhibit β-adrenergic blocking properties to an unusually marked degree and of desirably long duration.

A preferred subgroup of products therefore can be illustrated by the structure

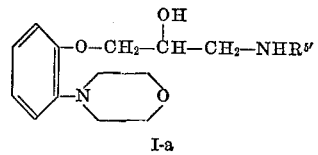

I-a wherein $R^{5'}$ has the more limited meaning given in the preceding paragraph.

The potential of a product of a β-adrenergic blocking agent conventionally is evaluated by the protocol which was employed to assess the β-blocking properties of the novel products of this invention. The protocol employed comprises intravenous administration of graded doses of the selected compound to rats which are then challenged with a standard dose of isoproterenol, a product known to be a β-stimulant. Testing the products of this invention by this protocol establishes that they not only possess β-adrenergic blocking properties of a marked degree but the blockade was maintained for a longer period of time than normally is seen with β-adrenergic blocking agents. The clinical application of β-adrenergic blocking agents are well known to physicians, a review of certain clinical applications being contained in the American Journal of Cardiology 18:3, 303–496 (1966), as well as in the New England Journal of Medicine, 275:1106–1112 and 1175–1183 (1966), Epstein et al., and Annals of Internal Medicine 67: 1333–1337 (December 1967), Epstein et al. One use for the novel products of this invention, which constitutes the best mode for use of the products known to applicants at this time, is for the control of tachycardia that may be drug induced (as by isoproterenol) or brought about by physiological conditions. In view of the considerable amount of literature that has accumulated concerning the use of β-adrenergic blocking agents, physicians would employ the products of this invention in any of the known conditions where a long-acting agent is needed, such as in the management of angina pectoris.

The products can be formulated in pharmactutical dosage forms suitable for oral or parenteral administration, preferably in the form of tablets, solutions, suspension and emulsions. The morpholinophenoxypropanolamines can be employed in the form of the free base or in the form of their salts in conjunction or admixture with organic and/or inorganic solid or liquid pharmaceutical excipients. No special problems are involved in preparing suitable formulations of these products and methods generally employed for this purpose, which are known to those skilled in this art, are entirely suitable. If desired, the compounds can be administered along with or formulated together with other active ingredients. Dosage units of from about 2 mgs. to 50 mgs. can be provided for the symptomatic adjustment of dosage by the physician depending upon the age and condition of the patient.

The 1-(morpholinophenoxy)-3-aminopropan-2-ols of this invention can be prepared by the following methods.

ROUTE I

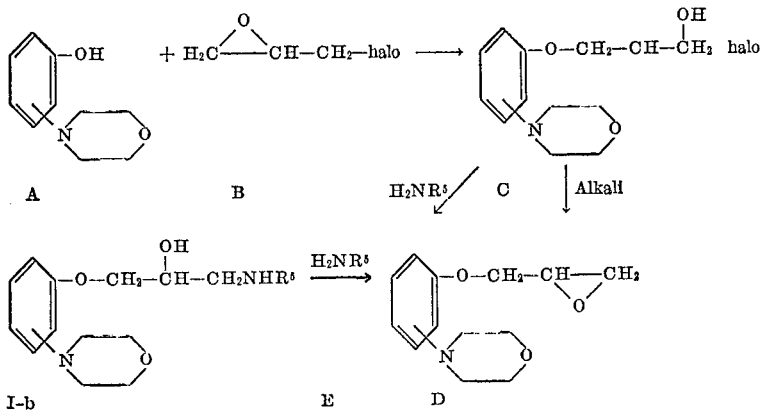

The known morpholinophenol (A) is treated with epichlorhydrin or epibromhydrin (B) to provide product C which optionally can be separated from the reaction mixture by extraction with ether. Ideally, the epihalohydrin is used in excess for its solvent properties and the reaction proceeds at ambient temperature or with heating up to about steam bath temperature. The reaction of A and B additionally is facilitated by the presence of a trace of base which serves as a catalyst, preferred catalyst being piperidine, piperidine hydrochloride, pyridine or other heterocyclic bases. Product C upon treatment with aqueous alkali affords the epoxide D. Aqueous sodium or potassium hydroxide are preferred at a concentration of about 20% for best yields. Treatment of the epoxide D with the amine E provides the desired 1-(morpholinophenoxy)-3-aminopropane-2-ols, I–b. Advantageously an excess of the amine is employed for its solvent properties; from 3 to 5 moles of the amine being adequate to give very good yields of the desired products. Larger quantities, of course, can be employed if so desired. This step can be carried out at ambient temperature although temperatures up to about 90° C. can be employed, if desired. It has also been found that certain amines, particularly branched chain mono-alkylamines, can be refluxed with the intermediate product C to give the desired product I–b directly.

When any one or more of the variables $R^1$, $R^2$ and $R^4$ is a lower alkyl, product I can be prepared by the reaction of starting substance A with an α-haloalkanoic acid of the structure

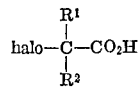

to provide a (morpholinophenoxy)-carboxyalkane which is converted by conventional methods to the acid chloride. Reaction of the acid chloride with a diazoalkane of the structure $R^4CH\text{---}N_2$ gives the 1-(morpholinophenoxy)-3-chloro-3-$R^4$-2-oxo-1-$R^1$-1-$R^2$-propane which upon reduction, preferably with sodium borohydride, affords the intermediate C having at least one alkyl substituent attached to one or more of the propanol carbons, which then is converted to compounds I–c by the procedures described above. This alternative method can, of course, be employed for preparing products wherein $R^1$, $R^2$ and $R^4$ are hydrogen.

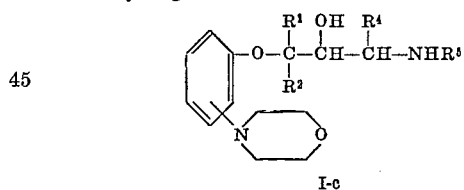

When $R^3$ of product I is benzoyl or lower alkanoyl, compound I–b or I–c is reacted with the desired acid anhydride or chloride at ambient temperature or with brief warming up to about 100° C. whereupon a good yield of the desired product I is formed. It would be obvious to remove the acyl group by conventional hydrolysis should one wish to reform the 2-hydroxy group.

Another route by which the novel compounds of this invention can be prepared can be illustrated as follows:

ROUTE II

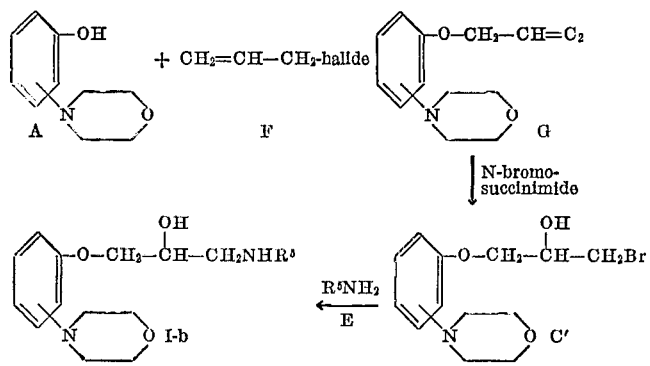

The morpholinophenol is reacted with an allyl halide such as allyl chloride or bromide at ambient temperature with heating up to about steam bath temperature to provide the N-(allyloxyphenyl)morpholine, G. Treatment of compound G with an aqueous solution of N-bromosuccinimide advantageously at about ambient temperature and if need be with cooling, provides N-[(3-halo-2-hydroxypropoxy)phenyl]morpholine, C'. Treatment of this product with an amine, E, by the method hereinbefore described provides the desired 1-(morpholinophenoxy)-3-(R⁵-amino)propan-2-ol.

The following examples will illustrate representative products of this invention prepared by the above described procedures. It will be understood that these compounds can be prepared by either Route I or Route II or a combination or modification of these Routes as described above. The following examples, therefore, are not to be considered as limiting the preparation of any particular compound to the method described in the examples as the examples are provided solely to illustrate the best modes currently known to applicants for the preparation of the novel products of this invention.

Example 1.—1-(2-morpholinophenoxy)-3-isopropylaminopropan-2-ol

Step A: Preparation of N-[2-(2,3-epoxypropoxy)phenyl]-morpholine.—A mixture of 35.8 g. (0.2 mole) of 2-morpholinophenol, 55.88 g. (0.6 mole) of epichlorohydrin, and 0.4 ml. of piperidine is heated six hours on a steam bath and any excess epichlorohydrin then is removed in vacuo. The crude 1-(2-morpholinophenoxy)-3-chloropropan-2-ol obtained is stirred for 1.5 hours at room temperature with 200 ml. of 5 N sodium hydroxide solution and 50 ml. of tetrahydrofuran. The mixture is extracted with diethyl ether and the combined ethereal extracts washed first with 20 ml. of 5 N sodium hydroxide and two 100 ml. portions of water. The ethereal solution is dried and evaporated to give 31.4 g. of an amber colored oil. The oil is distilled to afford 21.6 g. of N-[2-(2,3-epoxypropoxy)phenyl]morpholine, B.P. 113-120° C. (at 0.05 mm. pressure) which is suitable to be treated with primary amines.

Step B: Preparation of 1-(2-morpholinophenoxy)-3-isopropylaminopropan-2-ol.—The distilled epoxide (4.7 g.; 20 mmoles), 6.2 ml. of isopropylamine and 11 ml. of methanol is left 64 hours at room temperature. Methanol and excess isopropylamine then are removed in vacuo and the resulting oil is dissolved in diisopropyl ether, treated with charcoal and filtered. The filtrate gives 4.35 g. of crystalline product, having a melting point of 77-78° C. These crystals upon further crystallization from diisopropyl ether give pure 1-(2-morpholinophenoxy)-3-isopropylaminopropan-2-ol, M.P. 77.5-78° C.

Example 2.—1-(2-morpholinophenoxy)-3-tert-butylaminopropan-2-ol monophosphate ethanolate A mixture of 4.7 grams (20 mmoles) of N-[2-2,3-epoxypropoxy)phenyl]morpholine, 4.38 g. (60 mmoles) of tert-butylamine, and 10 ml. of tetrahydrofuran is heated six days at 43-45° C. The solvent and any excess tert-butylamine are removed in vacuo to give 5.42 g. of an oily product. Solutions of 5.25 g. of the crude base in 20 ml. of isopropanol and 1.96 g. of 85% phosphoric acid in 20 ml. of isopropanol are added simultaneously to 10 ml. of isopropanol. The resulting viscous product is extracted with a mixture of isopropanol-ethanol (5:1) by refluxing to give a 56.2% yield of solid product, M.P. 168–173° C. These solids upon further crystallization from the same solvent mixture give pure 1-(2-morpholinophenoxy)-3-tert-butylaminopropan-2-ol monophosphate ethanolate, M.P. 175–6° C.

Example 3.—1-(3-morpholinophenoxy)-3-isopropylaminopropane-2-ol oxalate

Step A: Preparation of N-[3-(2,3-epoxypropoxy)phenyl]morpholine.—By replacing the 2-morpholinophenol employed in Example 1, Step A, by an equimolecular quantity of 3-morpholinophenol and then following substantially the same procedure in Example 1, Step A, there is obtained N-[3-(2,3-epoxypropoxy)phenyl]morpholine.

Step B: Preparation of 1-(3-morpholinophenoxy)-3-isopropylaminopropan-2-ol oxalate.—Following the procedure described in Example 1, Step B, a mixture of 11.7 g. of N-[3-(2,3-epoxypropoxy)phenyl]morpholine and 14.3 ml. of isopropylamine dissolved in 20 ml. of methanol is left one week at room temperature to give the free base as a gum. Treatment with oxalic acid afforded a crystalline product, M.P. 153–7° C. The product upon recrystallization from ehtanol gives pure 1-(3-morpholinophenoxy)-3-isopropylaminopropan-2-ol oxalate, M.P. 165–167.5° C.

Example 4.—1-(4-morpholinophenoxy)-3-isopropylaminopropan-2-ol

Step A: Preparation of N-[4-(2,3-epoxypropoxy)phenyl]morpholine.—By replacing the 2-morpholinophenol employed in Example 1, Step A, by an equimolecular quantity of 4-morpholinophenol and then following substantially the same procedure described in Example 1, Step A, there is obtained N-[4-(2,3-epoxypropoxy)phenyl]morpholine.

Step B. Preparation of 1-(4-morpholinophenoxy)-3-isopropylaminopropan-2-ol. — Following the procedure described in Example 1, Step B, a mixture of 11.7 g. of N-[4-(2,3-epoxypropoxy)phenyl]morpholine and 12.5 ml. of isopropylamine dissolved in 25 ml. of methanol is left one week at room temperature to give 10.7 g. of crystalline product, M.P. 98–100.5° C. This solid is recrystalized from isopropanol to give pure 1-(4-morpholinophenoxy)-3-isopropylaminopropan-2-ol, M.P. 98.5–99.5° C.

The following examples illustrate methods for the preparation of products of this invention illustrated by structure I above, wherein $R^1$, $R^2$, $R^3$ and/or $R^4$ are other than hydrogen:

Example 5.—1-(2-morpholinophenoxy-3-tert-butylaminobutan-2-ol

Step A: Preparation of N-[2-(3-chloro-2-hydroxybutoxy)phenyl]morpholine.—2-morpholinophenol is treated with 2-chloroacetic acid in the presence of ethanolic sodium hydroxide to give N-(2-carbomethoxyphenyl)morpholine. Treatment of this acid with thionyl chloride or oxalyl chloride affords the acid chloride. The acid chloride (1 part) in 20 parts of diethyl ether is treated dropwise at −10° to −15° C. with a slight excess of diazoethane in 30 parts of diethyl ether and the mixture stirred one hour longer at −10° C. The solution is left at room temperature overnight, cooled to −10° to −15° C. and treated with anhydrous hydrogen chloride until evolution of nitrogen is complete. The solution is successively washed with water, a 5% sodium carbonate solution, and water. The dried solution is evaporated to a residue to give N-[2-(3-chloro-2-oxobutoxy)phenyl]morpholine. This crude product (1 part) in 5 parts of isopropanol is treated at 0–5° C. with a solution containing an excess of sodium borohydride in 5 parts of isopropanol. The mixture is left for 3 to 5 hours at room temperature, then poured onto a mixture of ice and acetic acid, the mixture is extracted with ether, and worked up to give N-[2-(3-chloro-2-hydroxybutoxy)phenyl]morpholine.

Step B: Preparation of 1-(2-morpholinophenoxy)-3-tert-butylaminobutan-2-ol hydrochloride.—A mixture of 1 part of N-[2-(3-chloro-2-hydroxybutoxy)phenyl]morpholine and 7.5 parts of butylamine is heated for 10 hours at 100° C. in a sealed vessel. The product is isolated by the method described in Example 1, Step B, to give N-[2-(3-butylamino-2-hydroxybutoxy)phenyl]morpholine. The base is dissolved in anhydrous diethyl ether and treated with anhydrous hydrogen chloride to give 1 - (2 - morpholinophenoxy)-3-tert-butylaminobutan-2-ol hydrochloride.

Example 6.—2-(2-morpholinophenoxy)-4-butylaminobutan-3-ol

Step A: Preparation of N-[2-(4-chloro-3-hydroxy-2-butoxy)phenyl]morpholine. — N - [2 - (4 - chloro-3-hydroxy-2-butoxy)phenyl]morpholine is prepared by a sequence of reactions similar to those described in Example 5, Step A. Thus 2-morpholinophenol is condensed with 2-bromopropionic acid to give N-[2-(1-methylcarboxymethoxy)phenyl]morpholine. The acid is converted by conventional methods to the acid chloride and the acid chloride treated with diazomethane in diethyl ether at −10° to −15° C. the dried ethereal solution is treated with anhydrous hydrogen chloride and the resulting chloroketone reduced with sodium borohydride to give N - [2-(4-chloro-3-hydroxy-2-butoxy)phenyl]morpholine.

Step B: Preparation of 2-(2-morpholinophenoxy)-4-butylaminobutan-3-ol.—The procedure set forth in Example 5, Step B, is repeated with the exception that N-[2-(3-chloro-2-hydroxybutoxy)phenyl]morpholine is replaced by N - [2-(4-chloro-3-hydroxy-3-butoxy)phenyl]morpholine. Thus 2-(2-morpholinophenoxy)-4-butylaminobutan-3-ol is obtained and isolated as the hydrochloride salt.

Example 7.—1-(2-morpholinophenoxy)-3-isopropylamino-2-acetoxypropane hydrochloride A mixture of 1 part of 1-(2-morpholinophenoxy)-3-isopropylaminopropan-2-ol, 5 parts of acetic acid, and 1 part of acetic anhydride is left 24 hours at room temperature. The solution is poured on ice, made alkaline with ammonium hydroxide, extracted with ethyl ether, and the ethereal solution dried over anhydrous magnesium sulfate. The ethereal solution is treated with anhydrous hydrogen chloride and the precipitated product is recrystallized from ethanol-diethyl ether to give 1-(2-morpholinophenoxy) - 3 - isopropylamino-2-acetoxypropane hydrochloride.

Example 8.—1-(2-morpholinophenoxy)-3-isopropylamino-2-benzoyloxypropane hydrochloride A mixture of 1 part of 1-(2-morpholinophenoxy)-3-isopropylaminopropan-2-ol and 2.5 parts of benzoyl chloride is heated for 4–6 hours at 100° C. The mixture is cooled and added to 25 parts of diethyl ether. The ether is decanted, the remaining solid is slurried with a further 25 parts of diethyl ether, and the mixture is filtered. The collected product is washed several times with further amounts of diethyl ether. The solid is recrystallized from ethanol-diethyl ether to give 1-(2-morpholinophenoxy)-3-isopropylamino.-2-benzoyloxypropane hydrochloride.

Example 9.—1-(2-morpholinophenoxy)-3-isopropylaminopropan-2-ol benzoate

A solution of 1 part of 1-(2-morpholinophenoxy)-3-isopropylaminopropan-2-ol in 50 parts of ethylacetate is added to a solution of 1 part of benzoic acid in 40 parts of diethyl ether. The resulting solid is collected on a filter plate and washed several times with diethyl ether. The product is crystallized from ethanol-diethyl ether to give 1-(2-morpholinophenoxy)-3-isopropylaminopropan-2-ol benzoate.

The preparation by Route II of the products of this invention will be illustrated by the following example. It will be understood that the meta- or para- morpholinophenol could be substituted for the ortho-morpholinophenol employed in the following example and that the N-[2-(3 - halo-2 - hydroxypropoxy)phenyl]morpholine could be replaced by the meta- and para- isomers and that the tert-butylamine employed in the following example could be replaced by any other desired amine to prepare the other novel products which fall within the scope of this invention.

Example 10.—1-(2-morpholinophenoxy)-3-tert-butylaminopropan-2-ol

Step A: Preparation of N-(2-allyloxyphenyl)morpholine.—A mixture of one mole of N-(2-allyloxyphenyl)-morpholine (prepared by the reaction of 2-morpholinophenol and allylchloride) in ten parts (volume/grams) of 80% ethanol containing 4 equivalents of sodium hydroxide per equivalent of the allyloxyphenylmorpholine is refluxed for two hours. The ethanol is removed in vacuo and the remaining residue dissolved in a minimum amount of water and made acidic (pH 2) with hydrochloric acid. The N-(2-allyloxyphenyl)morpholine is separated from the reaction mixture and used in the following step without purification.

Step B: Preparation of N-[2-(3-chloro-2-hydroxypropoxy)phenyl]morpholine.—A mixture of N-(2-allyloxyphenyl)morpholine (50 mmole) and N-bromosuccinimide (50 mmole) is suspended in 50 ml. of water and allowed to stand at room temperature for about 15 minutes. The thus formed N-[2-(3-chloro-2-hydroxypropoxy)phenyl]morpholine thus provided is separated from the aqueous medium and used in the following step without purification.

Step C: Preparation of 1-(2-morpholinophenoxy)-3-tert-butylaminopropan-2-ol.—A mixture of the thus obtained N-[2-(3-chloro-2 - hydroxypropoxy)phenyl]morpholine (5 mmole) in 6 ml. (excess) of tert-butylamine is refluxed for about 90 hours. The tert-butylamine hydrobromide that is formed during this reaction is precipitated by the addition of 100 ml. of diethyl ether. The salt is removed by filtration and the filtrate concentrated to remove diethyl ether and any excess tert-butylamine thus providing the 1-(2-morpholinophenoxy)-3-tert-butylaminopropan-2-ol.

Additional products of this invention that are prepared by substantially the same procedure described in Examples 1–4 are identified in the following table. The following products are prepared by replacing the 2-morpholinophenol and the isopropylamine of Example 1 by the reactants identified in the following table to provide the 1-(morpholinophenoxy)-3-substituted-aminopropan-2-ol product having the structure specified.

TABLE I

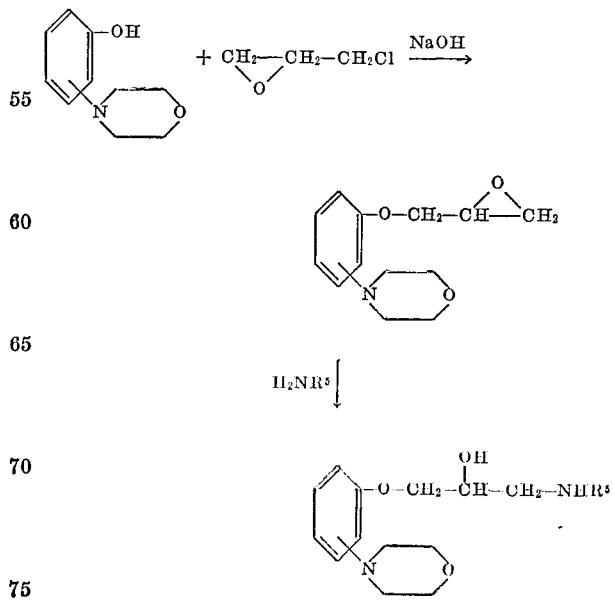

| Attachment of morpholino group | R⁵ |
|---|---|
| Ortho | —C(CH₃)₂—C₇H₁₅ |
| Meta | —C(CH₃)(CH₃—CH—CH₃)—C₇H₁₅ |
| Ortho | —CH(CH₃)—C₂H₅ |
| Do | —CH₂—CH(CH₃)₂ |
| Do | —CH(CH₃)—C₃H₇ |
| Do | —C₆H₁₃ |
| Do | —C₈H₁₇ |
| Para | —CH(CH₃)—C₆H₁₃ |
| Ortho | —CH(C₂H₅)—C₂H₅ |
| Do | —CH(C₂H₅)—C₃H₇ |
| Do | —CH(CH₃)—CH(CH₃)—CH₃ |
| Do | —CH(C₂H₅)—C₄H₉ |
| Do | —CH(CH₃)—C(CH₃)₂—CH₃ |
| Do | —C₁₀H₂₁ |
| Do | —CH(CH₃)—C₇H₁₅ |
| Do | —CH(CH₃)—C₅H₁₁ |
| Do | H |
| Do | —CH(CH₃)—CH=CH₂ |
| Do | —C(CH₃)₂—CH=CH₂ |
| Do | —CH(CH₃)—C≡CH |
| Do | —C(CH₃)₂—C≡CH |
| Meta | —⟨C₆H₁₁⟩-H |
| Ortho | —⟨C₆H₁₁⟩-H |
| Para | —⟨C₆H₁₁⟩-H |
| Ortho | —⟨C₆H₁₀⟩(CH₃)-H |
| Meta | —CH(CH₃)—(CH₂)₂—C₆H₅ |
| Para | —CH(CH₃)—CH₂—C₆H₅ |
| Ortho | —CH(C₂H₅)—CH₂—C₆H₅ |
| Do | —CH₂—C₆H₅ |
| Do | —(CH₂)₂—C₆H₅ |
| Do | —CH₂—⟨C₆H₄⟩—OCH₃ |
| Do | —(CH₂)₂—⟨C₆H₃⟩(OCH₃)—OCH₃ |
| Do | —CH(CH₃)—CH(CH₃)—CH₂—⟨C₆H₄⟩—Cl |
| Do | —CH(CH₃)—CH₂—⟨C₆H₄⟩—OH |
| Meta | —CH(CH₃)—CH₂—⟨C₆H₄⟩—OCH₃ |
| Ortho | —(CH₂)₃—⟨C₆H₄⟩—CH₃ |
| Do | —CH(CH₃)—(CH₂)₂—⟨C₆H₃⟩(OCH₃)—OCH₃ |
| Do | —CH(CH₃)—(CH₂)₂—⟨C₆H₃⟩(CH₃)—CH₃ |
| Para | —CH(CH₃)—(CH₂)₂—⟨C₆H₄⟩—OCH₃ |
| Meta | —CH₂—C₆H₅ |
| Ortho | —C₂H₅ |
| Do | —C₄H₉ |
| Do | —CH₃ |
| Meta | —C₄H₉ |

The invention further provides pharmceutical compositions comprising, as active ingredient, at least one of the compounds according to the invention in association with a pharmaceutical carrier or excipient. The compounds may be presented in a form suitable for oral, rectal or parenteral administration. Thus, for example, compositions for oral administration may be solid or liquid and may take the form of capsules, tablets, coated tablets, suspensions, etc., such compositions comprising carriers or excipients conveniently used in the pharmaceutical art. Thus suitable tabletting excipients include lactose, potato and maize starches, talc, gelatine, stearic acid, magnesium stearate, polyvinyl pyrrolidone, or other known tabletting substances.

For parenteral administration, the carrier or excipient may be a sterile, parenterally acceptable liquid, e.g., pyrogen-free water or an aqueous solution of polyvinyl pyrrolidone, or a parenterally acceptable oil, e.g., arachis oil, contained in ampoules.

In compositions for rectal administration, the carrier may comprise a suppository base, e.g., cocoa butter or a glyceride.

Advantageously, the compositions may be formulated as dosage units, each unit being adapted to supply a fixed dose of active ingredient. Tablets, coated tablets, capsules, ampoules and suppositories are examples of preferred dosage unit forms according to the invention. Each dosage unit adapted for oral administration may conveniently contain 10 to 50 mg., and preferably 25 to 50 mg., of the active ingredient; each dosage unit adapted for parenteral administration may conveniently contain 2 to 25 mg.

In the following examples, pharmaceutical compositions according to the invention are illustrated; other acid addition salts, or other active compounds can be substituted for that named, if so desired.

The pharmaceutical compositions of the following examples contain 1-(2-morpholinophenoxy) - 3 - tert-butyl-aminopropan-2-ol as active ingredient.

Example 11

An injectable solution is prepared by conventional methods containing:

|  | Mg. |
|---|---|
| Active compound | 25 |
| Sodium chloride | 9 |
| Bidist. water q.s. 1.0 ml. | |

Example 12

Capsules are prepared by conventional methods containing:

|  | Mg. |
|---|---|
| Active compound | 50 |
| Magnesium stearate | 2.0 |
| Lactose U.S.P. | 100.0 |

What is claimed is:

1. A product having the structure

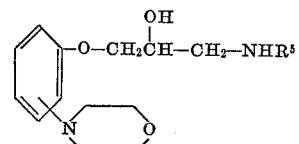

or pharmacologically active salts thereof wherein R⁵ is alkyl of 1 to 12 carbon atoms.

2. A product as claimed in claim 1 wherein the morpholino group is attached to the 2-position carbon of the phenyl moiety.

3. A product as claimed in claim 2 wherein $R^5$ is tert-butyl that is the product 1-(2-morpholinophenoxy)-3-tert-butylaminopropan-2-ol.

4. A product as claimed in claim 1 wherein the morpholino group is attached to the 3-position and $R^5$ is isopropyl.

5. A product as claimed in claim 1 wherein the morpholino group is attached to the 4-position and $R^5$ is isopropyl.

References Cited
UNITED STATES PATENTS 3,541,130  11/1970  Koppe et al. _____ 260—465
3,542,872  11/1970  Koppe et al. _____ 260—570.7

ALEX MAZEL, Primary Examiner
J. TOVAR, Assistant Examiner

U.S. Cl. X.R.
260—247.2 B; 424—248